(12) United States Patent
Tran (10) Patent No.: US 6,463,031 B1
(45) Date of Patent: Oct. 8, 2002

(54) RATE DETERMINATION TECHNIQUE THAT UTILIZES MODIFIED CUMULATIVE METRICS TO ORTHOGONALIZE THE RATES

(75) Inventor: Jean-Marie Tran, San Diego, CA (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/204,832

(22) Filed: Dec. 3, 1998

(51) Int. Cl.$^7$ ................................................. H04J 3/22
(52) U.S. Cl. ........................ 370/203; 370/232; 370/235; 370/242; 375/224
(58) Field of Search ................................ 370/203, 208, 370/320, 325, 342, 479, 232, 235; 375/130, 141, 225, 341

(56) References Cited

U.S. PATENT DOCUMENTS

| | | | |
|---|---|---|---|
| 5,170,396 A | 12/1992 | Rivers et al. | 371/6 |
| 5,317,595 A | 5/1994 | Ostman | 375/14 |
| 5,327,439 A | 7/1994 | Estola et al. | 371/43 |
| 5,396,653 A | 3/1995 | Kivari et al. | 455/88 |
| 5,420,889 A | 5/1995 | Juntti | 375/346 |
| 5,677,934 A | 10/1997 | Ostman | 375/349 |
| 5,771,226 A * | 6/1998 | Kaku | |
| 5,784,392 A | 7/1998 | Czaja et al. | 370/43.1 |
| 5,796,757 A | 8/1998 | Czaja | 371/46 |
| 5,881,053 A * | 3/1999 | Kimball | |
| 6,269,130 B1 * | 7/2001 | Hansquine | |
| 6,321,090 B1 * | 11/2001 | Soliman | |

FOREIGN PATENT DOCUMENTS

EP 0 446 745 A2 9/1991

OTHER PUBLICATIONS

Forney, G. David Jr., "The Viterbi Algorithm", Proc. IEEE, vol. 61, No. 3, Mar. 1973, pp. 268–278.
Seshadri, N. et al., "On Post–Decision Symbol–Reliability Generation", IEEE 1993, pp. 741–745.
Odenwalder, Joe, Proposed Walsh Cover to Improve Rate Determination on the F–FCH and R–FCH, Qualcomm TR45.5.4, May 11, 1998, pp. 1–27.
Fununaga, Keinsosuke, "introduction to Statistcal Pattern Recognition", 2$^{nd}$ Edition, Academic Press, 1990, Chapter 2 ("Random Vectors And Their Properties"), pp. 11–49.

* cited by examiner

Primary Examiner—William Luther
(74) Attorney, Agent, or Firm—Perman & Green, LLP (57) ABSTRACT

A method and apparatus, such as a radiotelephone, operates so as to (a) decode a signal received from a communications channel to extract data therefrom, the data being received at one of n rates and the signal being decoded at each of the n rates for generating n Cumulative Metrics; (b) defines a matrix M composed of n mean vectors derived from the n Cumulative Metrics; (c) orthogonalizes the n rates by inverting the matrix M and multiplying with an observable vector of Cumulative Metrics to obtain a discriminant vector; and (d) determining the correct rate from the discriminant vector as the row number having a maximum value. One or both of a fixed or an adaptive scaling can be applied to the soft data prior to Viterbi decoding, and the resulting Cumulative Metrics can be scaled again to undo the first scaling, prior to operation of the rate determination technique.

25 Claims, 4 Drawing Sheets

RATE DETERMINATION TECHNIQUE THAT UTILIZES MODIFIED CUMULATIVE METRICS TO ORTHOGONALIZE THE RATES

FIELD OF THE INVENTION

This invention relates generally to digital communications and, in particular, to multi-data rate digital communication systems.

BACKGROUND OF THE INVENTION

A voice and data communications system of particular interest herein uses a code. division, multiple access (CDMA) technique such as one originally defined by the EIA Interim Standard IS-95A, and in later revisions thereof and enhancements thereto. This CDMA system is based on a digital spread-spectrum technology which transmits multiple, independent user signals across a single 1.25 MHz segment of radio spectrum. In CDMA, each user signal includes a different orthogonal code and a pseudo-random binary sequence that modulates a carrier, spreading the spectrum of the waveform, and thus allowing a large number of user signals to share the same frequency spectrum. The user signals are separated in the receiver with a correlator which allows only the signal energy from the selected orthogonal code to be de-spread. The other users signals, whose codes do not match, are not de-spread and, as such, contribute only to noise and thus represent a self-interference generated by the system. The SNR of the system is determined by the ratio of desired signal power to the sum of the power of all interfering signals, enhanced by the system processing gain or the spread bandwidth to the baseband data rate.

The CDMA system as defined in IS-95A uses a code excited linear prediction (CELP)-based variable rate voice coding algorithm in which the data rate can change dynamically on a frame by frame basis as a function of the speech pattern (voice activity). The Traffic Channel frames can be transmitted at a data rate within one of two different rate sets, for example a full, ½, 1/4 or ⅛ rate (9600, 4800, 2400 and 1200 bps, respectively, for rate set 1 (RS1), or 14400, 7200, 3600 and 1800 bps, respectively, for rate set 2 (RS2)). With each lower data rate, the transmitted power ($E_s$) is lowered proportionally, thus enabling an increase in the number of user signals in the channel.

Since the data rate is not known a priori to the receiver, the conventional decoder, such as a well-known Viterbi type of decoder, performs sequential decoding of all possible rates and then determines the rate of the current data frame. In addition to decoding the block encoded, variable rate Traffic Channel, the Viterbi decoder performs decoding of other channels, such as (in IS-95) a continuously encoded Sync Channel with a fixed rate of 1200 bps, and a Paging Channel with a rate of 9600 or 4800 bps. A 20 ms Traffic Channel frame thus contains 192, 96, 48 or 24 data bits for rates 1, ½, 1/4 and ⅛, respectively, when using RS1, or 288, 144, 72 or 36 bits for rates 1, ½, 1/4 and ⅛, respectively, when using RS2.

Prior to convolutional encoding, the data bits for rate 1 and rate ½ are encoded with a CRC polynomial and (for RS1) the 12 and 8 bit (respectively) CRC fields are appended to the data bits. However, the 1/4 and the ⅛ rates are not protected by the CRC. For RS2 there are 12, 10, 8 and 6-bit CRCs for use from full rate down to ⅛ rate.

Each Traffic Channel frame is terminated with eight tail bits, which forces the Viterbi decoder to a known state. The 80 ms Sync Channel is continuously encoded and contains three 26.6 ms. frames, each containing 32 data bits.

If an error occurs in the associated CRC field, the received information is of little value in the rate determination process. There are other criteria which may be used in performing the rate determination: SER (Symbol Error Rate), and the size of the Viterbi-determined Cumulative Metric for the ML (Most Likely) path. However, in any practical system the use of these two parameters can be unreliable, since the first parameter varies largely as a function of SNR (Signal-to-Noise Ratio), while the second parameter is typically distorted by a scaling of the ML path Cumulative Metrics during the decoding process.

In commonly assigned U.S. Pat. No. 5,796,757, "Methods and Apparatus for Performing Rate Determination with a Variable Rate Viterbi Decoder", S. Czaja, issued Aug. 18, 1998, there is described a technique for determining a data rate of a received signal. The rate determination uses a decision tree approach where hypothesized rates are tested successively. The data used are the Cumulative Metrics for the four rates and the CRC checks of the different rates, when available.

Reference can also be had to a submission to the Telecommunications Industry Association (TIA) entitled "Proposed Walsh Cover to Improve Rate Determination on the F-FCH and R-FCH", TR45.5.4/98.05.11., Vancouver, BC, May 11, 1998. The basic proposal of this document is to replace symbol repetition used for the lower data rates with orthogonal Walsh sequences, thereby reducing the frame energy for an incorrect rate hypothesis.

OBJECTS AND ADVANTAGES OF THE INVENTION

It is a first object and advantage of this invention to provide an improved rate determination technique for use when receiving data from a communications channel.

It is another object and advantage of this invention to provide an improved rate determination technique for use when receiving data from a radio communications channel such as, but not limited to, a code division multiple access radio channel.

It is a further object and advantage of this invention to provide a radiotelephone having a receiver and an improved rate determination technique for use when receiving data from a radio communications channel.

SUMMARY OF THE INVENTION

The foregoing and other problems are overcome and the objects and advantages are realized by methods and apparatus in accordance with embodiments of this invention.

In a first aspect this invention provides a method and apparatus for determining a data rate of a received encoded signal. The method includes steps of (a) decoding a signal received from a communications channel to extract data therefrom, the data being received at one of a plurality of rates and decoded at each of the plurality of rates for generating a Cumulative Metric for each of the plurality of rates; (b) modifying the Cumulative Metrics to orthogonalize the plurality of rates; and (c) determining the correct received rate from the modified Cumulative Metrics.

In a further aspect this invention provides a method that includes steps of (a) decoding a signal received from a communications channel to extract data therefrom, the data being received at one of n rates and the signal being decoded at each of the n rates for generating n Cumulative Metrics;

(b) defining a matrix M composed of n mean vectors derived from the n Cumulative Metrics; (c) orthogonalizing the n rates by inverting the matrix M and multiplying with an observable vector of Cumulative Metrics to obtain a discriminant vector; and (d) determining the correct rate from the discriminant vector as the row number having a maximum value.

In one embodiment the step of defining includes a step of deriving the n mean vectors by a step of averaging observable vectors over a plurality of frames and then normalizing. In another embodiment the step of defining includes steps of ((e) deriving the n mean vectors by a step of computing a covariance matrix over a plurality of frames; (f) performing an eigenvalue-eigenvector decomposition; (g) normalizing the eigenvectors norm; and (h) obtaining the desired vector from the signal space eigenvector (as the eigenvector which has a largest eigenvalue).

The matrix $M^{-1}$ can be computed in advance and stored. If computed in advance, the matrix $M^{-1}$ is computed assuming a predetermined signal-to-noise ratio that corresponds to a predetermined frame error rate.

The method includes a further step of testing a data integrity value, typically a CRC, associated with the received data.

Further in accordance with the teachings of this invention, the step of decoding includes a preliminary step of scaling soft data with at least one of a fixed or adaptive scaling factor, and the generation of the n Cumulative Metrics includes a subsequent step of scaling the Cumulative Metrics so as to undo the adaptive scaling.

The step of decoding may decode an entire frame of soft data, or may decode less than an entire frame of soft data to generate the n Cumulative Metrics.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
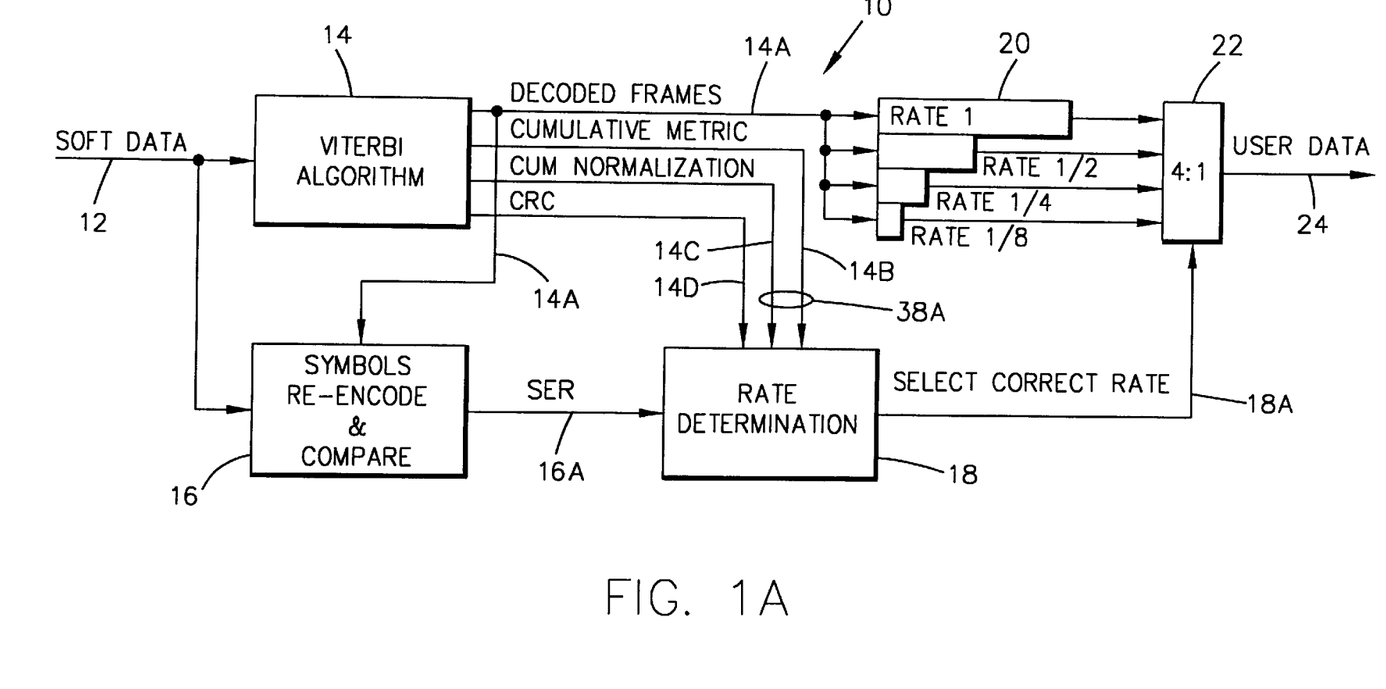
FIG. 1A is block diagram of a portion of a receiver that is suitable for practicing this invention.

FIG. 1A illustrates a portion of a variable rate receiver 10 that is constructed in accordance with the invention disclosed in the above-referenced commonly assigned U.S. Pat. No. 5,796,757, "Methods and Apparatus for Performing Rate Determination with a Variable Rate Viterbi Decoder", S. Czaja, issued Aug. 18, 1998, the disclosure of which is incorporated by reference herein in its entirety insofar as it does not conflict with the teachings of the present invention.

A description of this previous technique will first be made, followed by a description of one suitable embodiment of a radiotelephone (FIG. 2) for practicing this invention, in order to place the present invention in context and to facilitate the description of the various aspects of the present invention.

Figure 2:
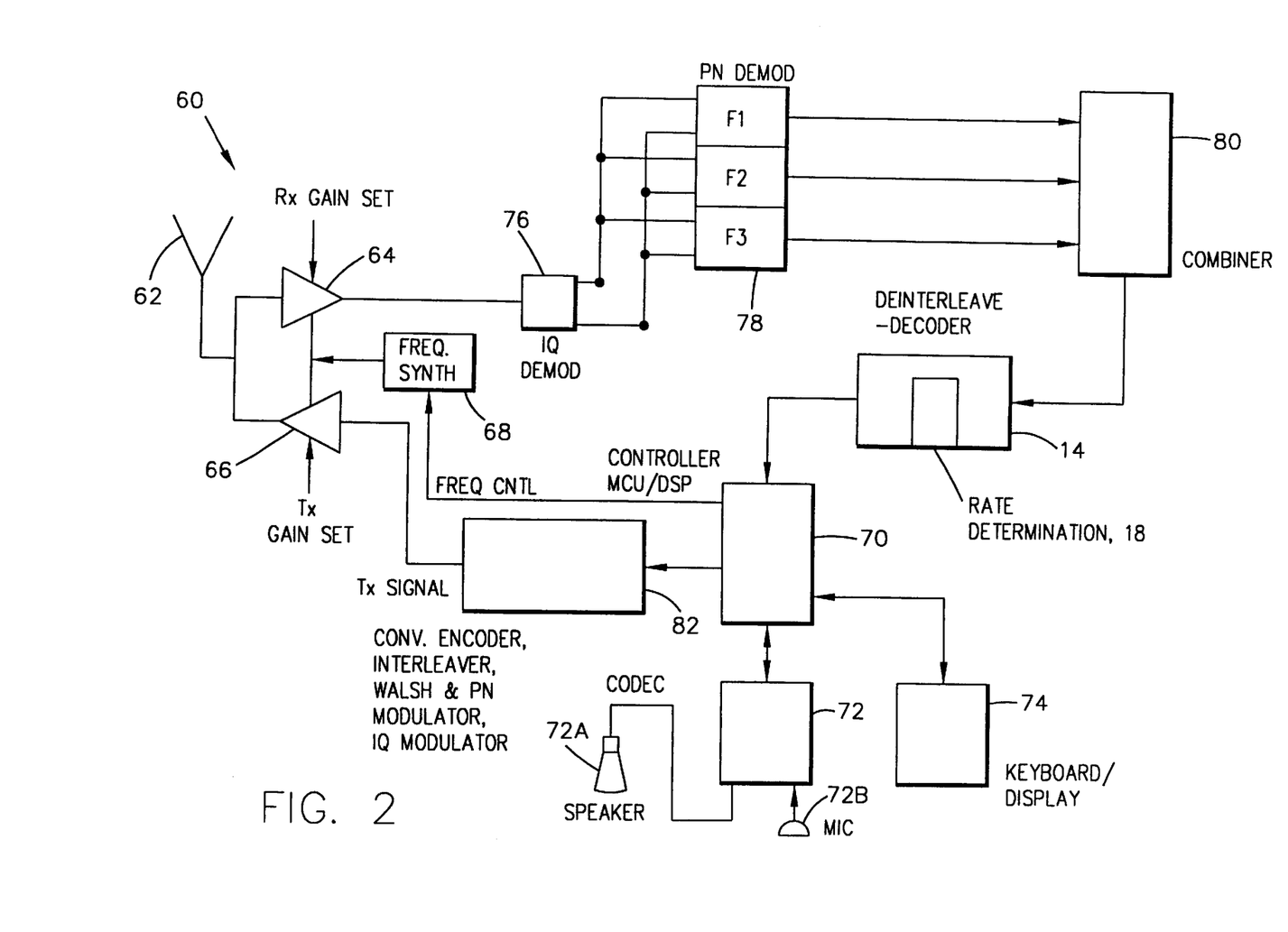
FIG. 2 is a block diagram of radiotelephone that includes the circuitry shown in FIG. 1A.

The receiver 10 may form a portion of a radiotelephone 60 as shown in FIG. 2, such as one compatible with the IS-95 Code Division Multiple Access (CDMA) specification, although the receiver is not limited to only this one application and technical environment. Other portions of the radiotelephone 60, shown in FIG. 2 and described below, include an antenna, suitable RF receiving and down-conversion circuits, a demodulator, and an analog to digital (A/D) converter for converting received data to a digital format. For a CDMA receiver it is understood that the receiver includes a suitable signal de-spreader or demodulator, such as a RAKE demodulator having one or more fingers (also shown in FIG. 2).

Frames of soft data 12 that are received from the communications channel are applied to an input of a Viterbi decoder block 14 and to an input of a Symbol Re-encode and Compare (SRC) block 16. The Viterbi decoder block 14 operates to provide a decoded frames output 14a to a second input of the SRC 16 and also to an output register block The output register block 20 includes four registers of different lengths, corresponding to the four rates (R1, R½, R¼, R⅛) of a given Rate Set. The Viterbi decoder block 14 also outputs to a Rate Determination block 18 a Cumulative Metric signal 14k, a Cumulative Metric Normalization signal 14c, and (optionally) a CRC signal 14d. A fourth (optional) input to the Rate Determination block 18 is the Symbol Error Rate (SER) 16a that is output from the SRC 16. The Rate Determination block 18 processes all or some of these various inputs and outputs a Select Correct Rate signal 18a to a 4:1 multiplexer 22 which selects a correct one of the output registers 20 as a source of user data 24 for a given received frame, which is the desired result.

It is known in the art that various criteria can be used to determine thresholds based on the parameters obtained from the Viterbi decoder 14 during the decoding process. In the invention described in the above-referenced U.S. Pat. No. 5,796,757, these thresholds are used by the Rate Determination block 18 to determine the data rate of the current frame.

When considering the RS1, and by example, the CRC polynomial 14d that is output from the Viterbi decoder 14 is 12 bits in length for Rate 1, and protects 172 bits of data. The CRC polynomial 14d is, for example, eight bits in length for Rate ½, and protects 80 bits of data. It is assumed that when decoding with the incorrect data rate (i.e., the actual transmitted rate is not equal to the decoder rate), the channel code-words, when combined into branch metric symbols, resemble noise due to the symbol repetition. Thus, for the Rate 1 the probability of the CRC polynomial 14d to be erroneously decoded is approximately $2.44^{-4}$. For the Rate ½ this probability is only $\frac{1}{256}$, and is thus of significantly lesser value. In the IS-95 RS1 embodiment the CRC polynomial 14d is not available at all for the two lowest rates. The SER signal 16a is only reliable in a high SNR channel, and thus also has limited value.

The size of the Cumulative Metrics of the Most Likely (ML) path is also a function of the SNR. However, when taking into consideration certain properties of the IS-95 system, such as changes in transmitted power proportional to the transmitted rate,-symbol repetition rate, and the size of the data fields for each rate, a large variance in the size of the Cumulative Metrics can be expected.

Optionally, at the completion of decoding the size of the Cumulative Metrics can be normalized for each data rate. This is accomplished by dividing the size of the Cumulative Metrics for the half, quarter and eighth rates by some scaling factor, such as but not limited to 2.

In systems operating in accordance with IS-95, the traffic channel maintains a constant channel rate of 19.2 kbps regardless of the actual rate transmitted. As a result the symbols are repeated in the inverse proportion to the actual rate. This allows the base station transmitter to lower the transmitted energy in the same proportion. In order to map the signal dynamic range to M bits for input to the viterbi decoder, without clipping or introducing quantization noise, scaling is required.

Figure 1B:
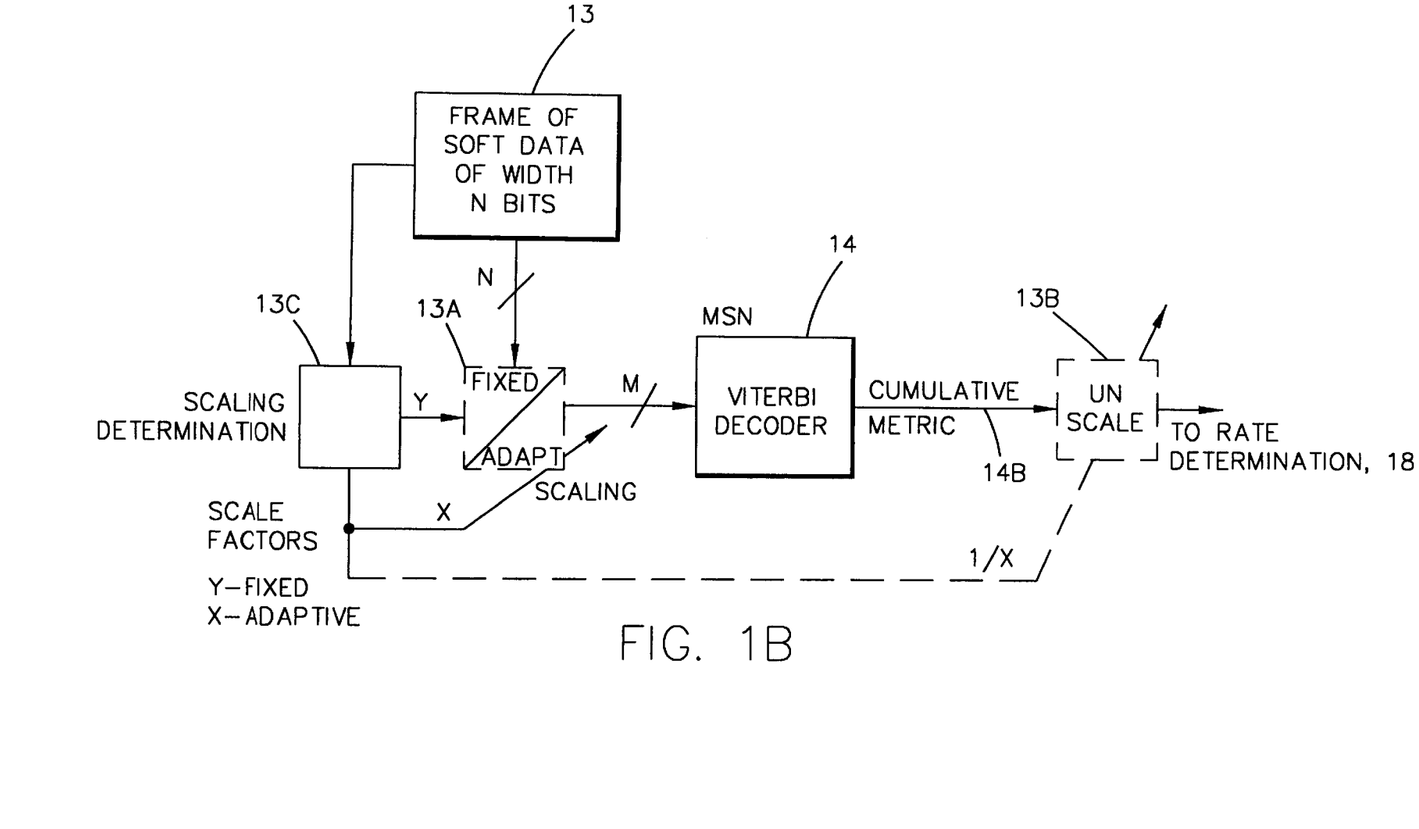
FIG. 1B is block diagram of a portion of the receiver of FIG. 1A, and is useful in understanding a description of various scaling techniques, including an adaptive scaling technique.

The scaling factors or value(s) could be determined adaptively by a scaling determination block 13C based on a frame 13 of soft data having a width N bits. For example, one could take the RMS average and scale the soft data to M bits, where M is less than or equal to N. The scaling could be derived in advance, such that it is common to all rates or specific to each rate, and the required scaling values stored in the radiotelephone 60 such that the performance of the Viterbi decoder 14 is optimal in the typical SNR operating ranges. The resulting cumulative metric could then be scaled again (the original adaptive scaling being undone) prior to the application of the rate determination technique in accordance with this invention.

It is preferred that any fixed scaling be done first using fixed scale factor(s) y, followed by the adaptive scaling using adaptive scale factors x. The scaling (fixed and adaptive) would be accomplished in the scaling block 13A, prior to the application of the soft data to the Viterbi decoder 14, and then the resulting Cumulative Metrics could be "unscaled" at the output of the Viterbi decoder 14 using the second scaling block 13B. In this manner some lower rate frames could be transmitted at a higher traffic $E_c/I_{or}$, which would then require different scaling at the input to the Viterbi decoding function 14. In any event, scaling before the Viterbi decoder 14 and unsealing after the Viterbi decoder 14, can be defined for each rate set, and the soft data could be scaled using any of a number of techniques and criteria.

It should thus be appreciated that scaling can incorporate a default (fixed) scaling, or a frame adaptive scaling for each decoded rate. Referring also to FIG. 3B, the scaling can then be undone before storing and then sending the Cumulative Metrics to the rate determination block 18.

With regard to scaling in general, it should be noted that some fixed scaling is usually required and is accomplished prior to the Viterbi decoder 14. The fixed scaling is generally undone in the rate determination block 18. Adaptive scaling is also accomplished prior to the Viterbi decoder 14, but is unscaled (undone) prior to the rate determination block 18. In the unsealing block 13B, in addition to undoing the adaptive scaling, the fixed scaling could be undone (optionally) as well. Alternatively, one can simply ignore the fixed scaling, and the fixed scaling of the Cumulative Metrics will be undone in the rate determination block 18.

Referring now to FIG. 2, there is illustrated a spread spectrum radiotelephone 60 that is suitable for practicing the rate determination methods and apparatus of this invention. Certain ones of the blocks of the radiotelephone 60 may be implemented with discrete circuit elements, or as software routines that are executed by a suitable digital data processor, such as a high speed signal processor. Alternatively, a combination of circuit elements and software routines can be employed. As such, the ensuing description is not intended to limit the application of this invention to any one particular technical embodiment.

In the preferred embodiment of this invention the spread spectrum radiotelephone 60 operates in accordance with a Direct Sequence, Spread Spectrum, Code Division Multiple Access technique, such as known as or derived from TIA/EIA/IS-95A. However, compatibility with any one particular standard or air interface is not to be considered a limitation upon the practice of this invention.

The radiotelephone 60 includes an antenna 62 for receiving RF signals from a cell site, hereafter referred to as a base station (not shown), and for transmitting RF signals to the base station. When operating in the digital (spread spectrum or CDMA) mode the RF signals are phase modulated to convey speech and signalling information. Coupled to the antenna 62 are a gain controlled receiver 64 and a gain controlled transmitter 66 for receiving and for transmitting, respectively, the phase modulated RF signals. A frequency synthesizer 68 is controlled by a signal line from a controller 70 to provide the required frequencies to the receiver and transmitter. The controller 70 is comprised of a slower speed MCU for interfacing, via a codec 72, to a speaker 72A and a microphone 72B, and also to a keyboard and a display 74. In general, the MCU is responsible for the overall control and operation of the radiotelephone 60. The controller 70 is also preferably comprised of a higher speed digital signal processor (DSP) suitable for real-time processing of received and transmitted signals.

The received RF signals are converted to baseband in the receiver and are applied to a phase demodulator 76 which derives in-phase (I) and quadrature (Q) signals from the received signal. The I and Q signals are converted to digital representations by suitable A/D converters and applied to a multiple finger (e.g., three fingers F1–F3) demodulator 78, each of which includes a local PN generator. The output of the demodulator 78 is applied to a combiner 80 which outputs a signal to the controller 70, via the deinterleaver and the decoder 14 that is constructed and operated in accordance with this invention. The digital signal input to the controller 70 is expressive of speech samples or signalling information and, in accordance with the teaching of this invention, the rate at which a frame of data was received.

An input to the transmitter 66 (vocoded speech and/or signalling information) is derived from the controller 70 via a convolutional encoder, interleaver, Walsh modulator, PN modulator, and I-Q modulator, which are shown collectively as the block 82.

Having described one suitable technical environment within which the teachings of this invention may be practiced, a detailed description of the various aspects of the present invention will now be undertaken.

The rate determination algorithm and technique in accordance with this invention differs in several aspects from conventional rate determination algorithms. In one important aspect the inventive rate determination algorithm differs in the way it separates the rate determination problem into (a) the actual rate determination and (b) the detection of errors in categorized frames. This implies that the rate is determined first, and once the rate is determined, the CRC is checked if available. That is, the CRC need not be used in determining the received data rate.

The data used for the rate determination are the same as the data used in the above-referenced commonly assigned U.S. Pat. No. 5,796,757, that is, the Cumulative Metrics, and can be obtained using the same techniques disclosed in U.S.

Pat. No. 5,796,757. In general, the Cumulative Metrics may be considered as an accumulation of the transition probabilities in the decoder trellis for an assumed rate, and the rate determination problem can be thought of as a classification problem.

Another significant distinction between the inventive rate determination technique of this invention and conventional rate determination techniques is that instead of using the cumulative metrics as discriminants (without modification), the cumulative metrics are instead first processed to make the rates orthogonal or substantially orthogonal.

The orthogonalization procedure is as follows. Under the hypothesis of a particular rate, the observable vector made of the four Cumulative Metrics for the four rates is a random vector with statistical properties that can be characterized in terms of vector's mean value and its covariance matrix.

A discussion of random vectors can be found in "Introduction to Statistical Pattern Recognition", Keinosuke Fununaga, $2^{nd}$ Edition, Academic Press, 1990, Chapter 2, pgs. 11–49, the disclosure of which is incorporated by reference.

To a first order, each rate corresponds to a different mean vector. The set of four different mean vectors forms a basis for a 4-dimensional space, so it is possible to perform a change in a variable to orthogonalize the coordinates, and therefore to simplify the rate determination through this orthogonalization.

In greater detail, if one denotes $\vec{v}_i$ as the mean vector for each hypothesis, where i=0 for full rate, 1 for 1/2 rate, 2 for 1/4 rate and 3 for 1/8 rate, such that $$\|\vec{v}_i\|=C,$$

where C is a constant (equal to 1 for instance), then the matrix $$M=[\vec{v}_0 \vec{v}_1 \vec{v}_2 \vec{v}_3]$$

has a full rank and can be inverted. The change of variable by multiplying by $M^{-1}$ allows one to effectively orthogonalize the decision metric. This implies that $M^{-1}\vec{v}_i = \vec{u}_i$, where the vector $\vec{u}_i$ has a single non-zero component on row i. Therefore, in practical terms, the discriminant vector given by $$\vec{W}=M^{-1}\vec{O},$$

where $\vec{O}$ is the observable vector, is such that the row number of the maximum value indicates the rate received.

In practice, the vectors $\vec{v}_i$ are obtained by taking the average value of the observable vector over a number of frames and normalizing, for example, to unity, or by a process of computing a covariance matrix over a number of frames $$\mathrm{Cov}=E(\vec{O},\vec{O}^T)=\Sigma\vec{O}_\kappa \cdot \vec{O}_\kappa^T,$$

where κ denotes a time index, then performing an eigenvalue-eigenvector decomposition and normalizing the eigenvectors norm to a constant. The desired vector is the signal space eigenvector. This latter approach may be used for increased robustness by estimating the covariance matrix under several signal-to-noise ratio conditions. As long as the covariance matrix has a single dominant eigenvalue in a variety of environments, the corresponding eigenvector is the best choice as $\vec{v}_i$.

Figure 3A:
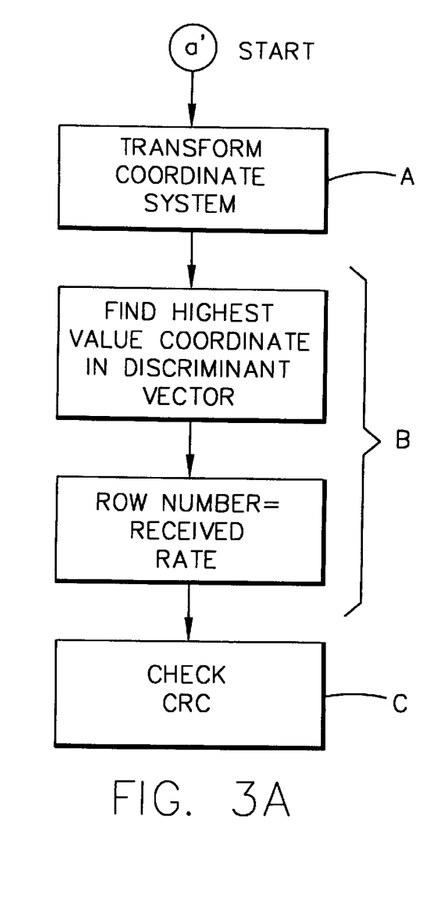
FIG. 3A is a logic flow diagram of a method in accordance with this invention.
Figure 3B:
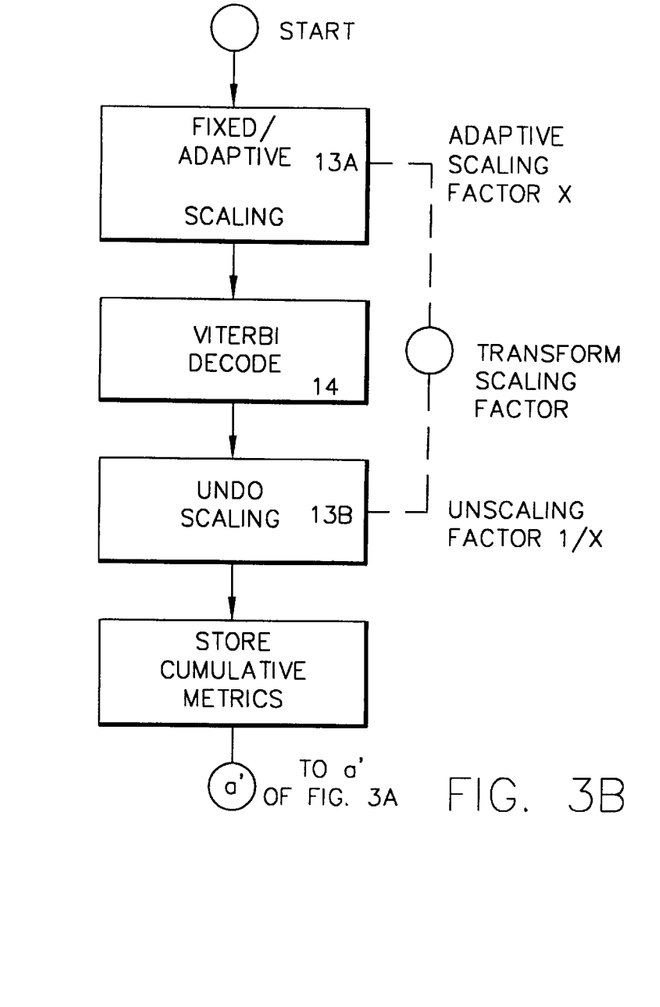
FIG. 3B is a logic flow diagram that illustrates the adaptive scaling that was mentioned previously with respect to FIG. 1B.

Referring to FIG. 3A, the preferred algorithm that is executed by the rate determination block 18 of FIG. 2, in accordance with this invention, can be summarized as: (Step A) transforming the coordinate system, (Step B) finding which coordinate in the new discriminant vector has the highest value, and obtaining the rate therefrom; and (Step C) checking the error indicator(s), such as the CRC if available.

FIG. 3B illustrates the optional adaptive scaling that was described previously with respect to FIG. 1B. These scaling steps can be performed-prior to the Step A of FIG. 3A. The Viterbi decoding step shown in FIG. 3B could decode less than a full frame, as will be discussed in greater detail below. When the adaptive scaling technique is used the selected scaling factor is made available, suitably transformed, to the unsealing block (see also FIG. 1B). If fixed scaling is used, and as was discussed above, the fixed scaling can optionally be removed in the unsealing block 13B, or the fixed scaling can be ignored and subsequently removed in the rate determination process.

The following pseudocode depicts a particular, but not limiting, implementation of the foregoing method. In the following m1, m2, m4, m8 are the Cumulative Metrics, and q1, q2, q4, q8 are the CRC checks, if available.

```
/* Change of coordinate system */
metric[0]=m1;
metric[1]=m2;
metric[2]=m4;
metric[3]=m8;
for (1=0; 1<4; 1++)
{
    new_metric[1]=0
    for(j=0;j<4;j++)new_metric[1]+=M⁻¹[1][j]*metric[j];
}
/*Find the maximum location */
max=new_metric[0];
rate=0;
for (1=1;1<4;1++)
{
    if(new_metric[1]>max)
    {
        max=new_metric[1];
        rate = 1;
    }
}
/*Check CRC bits if available */
if (rate == 0 && !q1) rate = Erasure;
else if (rate == 1 && !q2) rate = Erasure;
else if (rate == 2 && !q4) rate = Erasure;
else if (rate == 3 && !q8) rate = Erasure.
```

With regard to "tuning" the inventive algorithm, the matrix $M^{-1}$ can be computed in advance, then stored in a memory of the radiotelephone 60, by assuming a signal-to-noise ratio corresponding to a 1% Frame Error Rate (FER) level. The orthogonalization matrix used in the following simulations is given by:

$$M^{-1} = \begin{vmatrix} 3.6484 & -5.268 & -3.894 & -12.928 \\ -1.932 & 9.7368 & -7.257 & -10.3283 \\ -0.573 & -2.84 & 18.591 & -15.910 \\ -0.217 & -1.263 & -7.310 & 39.15 \end{vmatrix}$$

The matrix M was obtained by computing a covariance matrix for each rate, performing an eigenvalue-eigenvector decomposition and keeping the most significant eigenvector. The matrix M is given by It should be pointed out that one can quantize $M^{-1}$ to n-bits $$M = \begin{vmatrix} 0.9466 & 0.8966 & 0.9095 & 0.9187 \\ 0.3030 & 0.4215 & 0.3701 & 0.3617 \\ 0.1051 & 0.1285 & 0.1820 & 0.1426 \\ 0.0347 & 0.0426 & 0.0510 & 0.0689 \end{vmatrix}$$

for performing fixed point calculations in a digital signal processor (DSP). For example, a 16-bit or 8-bit, or lower, quantization may be sufficient to achieve substantial orthogonalization.

Table 1 shows the mean and standard deviation of the decision metrics after the orthogonalization that was obtained in simulations. The distribution of the new metrics appear well behaved in all cases.

TABLE 1

Statistical Properties of the Decision Metric (simulations)

| TX Rate | Statistics | M1 | M2 | M4 | M8 |
|---|---|---|---|---|---|
| Full Rate | mean | 1971.5 | 6.417 | −5.76 | −19.15 |
| | σ | 176.7 | 141.83 | 161.22 | 194.87 |
| ½ Rate | mean | 5.499 | 1375.7 | 3.39 | −22.09 |
| | σ | 105.75 | 162.54 | 138.76 | 169.14 |
| ¼ Rate | mean | 11.05 | 17.62 | 1056.20 | 4.05 |
| | σ | 95.11 | 88.14 | 177.29 | 168.92 |
| ⅛ Rate | mean | −8.84 | 12.69 | −11.76 | 958.677 |
| | σ | 110.0 | 81.897 | 78.65 | 193.45 |

It has been shown immediately above how the inventive algorithm is tuned, as well as providing a high level characterization of the expected performance. In the ensuing portion of the description these results are related to experimental data.

The goal of the tests was to extract directly from the radiotelephone 60 the normalization metrics used for the rate determination algorithm. The normalization metrics for all four rates were obtained directly from the radiotelephone 60 using loopback tests, for all four transmit rates of 1% FER. The metric values were subsequently logged and then extracted from the logs.

The covariance matrix approach described above was utilized to estimate the matrix M. This matrix obtained with the experimental data is $$M = \begin{vmatrix} 0.9487 & 0.8989 & 0.9101 & 0.9192 \\ 0.2969 & 0.4175 & 0.3685 & 0.3610 \\ 0.1028 & 0.1265 & 0.1829 & 0.1415 \\ 0.0346 & 0.0413 & 0.0507 & 0.0684 \end{vmatrix}$$

It can be seen that this matrix is very close to the matrix obtained in the simulations. In other words, the one-dimensional space generated by the vector composed of the four normalization metrics, which corresponds to a particular rate, is the same whether it is obtained in simulations or with real data. Therefore the inventive method is very robust, and is capable of yielding accurate rate determinations under various conditions of use.

The mean and standard deviation of the decision metric vectors after orthogonalization (by the change of variable described above), and transformed so that they have unit norm, are given in Table 2. Again, these results show the accuracy of the algorithm when operating on actual data.

TABLE 2

Statistical Properties of the Decision Metrics for Actual Data

| TX Rate | Statistics | M1 | M2 | M4 | M8 |
|---|---|---|---|---|---|
| Full Rate | mean | 0.9870 | −0.0440 | −0.0236 | 0.0265 |
| | σ | 0.0138 | 0.0636 | 0.0852 | 0.1053 |
| ½ Rate | mean | 0.0531 | 0.9823 | 0.000106 | −0.0228 |
| | σ | 0.0826 | 0.0201 | 0.0977 | 0.1288 |
| ¼ Rate | mean | 0.0145 | −0.0127 | 0.9791 | 0.0077 |
| | σ | 0.0877 | 0.0830 | 0.0333 | 0.1589 |
| ⅛ Rate | mean | 0.0378 | 0.0198 | 0.0026 | 0.9733 |
| | σ | 0.1359 | 0.104 | 0.1015 | 0.1063 |

It is pointed out that a great improvement in AWGN performance is obtained as compared to conventional rate determination techniques. The rates are made orthogonal to one another and there is no misclassification whatsoever, even when in excess of $10^6$ frames have been processed.

In a fading condition the performance of the inventive rate determination algorithm has also been found to be very robust. The rates are substantially orthogonal with a probability of misclassification on the order of $10^{-6}$, except for ¼ rate frames which can be misclassified with a probability on the order of $10^{-5}$.

Although the invention has been described in the context of specific data rates, numbers of data rates, numbers of vectors, and the like, it will be appreciated that these values are illustrative of only certain embodiments of this invention, and are not intended to be read or construed in a limiting sense upon the practice of this invention.

Furthermore, this invention can be implemented in, and practiced with, hardware components, software running under a suitable data processor, such as the processor 70 of FIG. 2, or as a combination of hardware and software. The logic flow diagrams of FIGS. 3A and 3B could thus be viewed as well as a block diagram of hardware elements that are connected as shown for processing frames of received data to determine the received data rate and to optionally check the data integrity bits, such as a CRC.

It should further be appreciated that it is not necessary to decode the entire frame for a given rate in order to make the rate determination in accordance with this invention. That is, a partial decoding of the frame, for example Viterbi decoding only about 50% of the frame, may be sufficient to obtain the Cumulative Metrics for use by the rate determination technique of this invention. Partial frame decoding can enhance the processing efficiency of the receiver 10, and may also reduce power consumption, which is an important consideration in handheld, battery powered communicators.

Furthermore, the teaching of this invention has been disclosed in the context of a radiotelephone, such as one adapted for communication over a mobile communication channel. It should be realized, however, that the teachings of this invention apply as well to a fixed site receiver, such as a base station receiver that communicates with the radiotelephones.

Thus, while this invention has been particularly shown and described with respect to preferred embodiments thereof, it will be understood by those skilled in the art that changes in form and details may be made therein without departing from the scope and spirit of the invention.

What is claimed is:

1. A method for determining a data rate of a received encoded signal, comprising the steps of:

decoding a signal received from a communications channel to extract data therefrom, the data being received at one of a plurality of rates and decoded at each of the plurality of rates for generating a Cumulative Metric for each of the plurality of rates;

modifying the Cumulative Metrics to orthogonalize the plurality of rates; and determining the correct received rate from the modified Cumulative Metrics.

2. A method for determining a data rate of a received encoded signal, comprising the steps of:

decoding a signal received from a communications channel to extract data therefrom, the data being received at one of n rates and the signal being decoded at each of the n rates for generating n Cumulative Metrics;

defining a matrix M composed of n mean vectors derived from the n Cumulative Metrics;

orthogonalizing the n rates by inverting the matrix M to form matrix $M^{-1}$ and multiplying with an observable vector of Cumulative Metrics to obtain a discriminant vector; and determining the correct rate from the discriminant vector as the row number of maximum value.

3. A method as in claim 2, wherein the step of defining comprises a step of deriving the n mean vectors by a step of averaging observable vectors over a plurality of frames and then normalizing.

4. A method as in claim 2, wherein the step of defining comprises steps of:

deriving the n mean vectors by a step of computing a covariance matrix over a plurality of frames;

performing an eigenvalue-eigenvector decomposition;

normalizing the eigenvectors; and obtaining the desired vector from the signal space eigenvector.

5. A method as in claim 2, wherein the matrix $M^{-1}$ is computed in advance and stored.

6. A method as in claim 5, wherein the matrix $M^{-1}$ is computed in advance assuming a predetermined signal-to-noise ratio that corresponds to a predetermined frame error rate.

7. A method as in claim 2, and further comprising a step of testing a data integrity value associated with the received data.

8. A method as in claim 7, wherein the data integrity value is comprised of a CRC value.

9. A method as in claim 2, wherein the step of decoding includes a preliminary step of scaling soft data with at least one of a fixed or an adaptive scaling factor.

10. A method as in claim 9, and wherein the step of generating n Cumulative Metrics includes a subsequent step of scaling the Cumulative Metrics so as to undo the scaling of the soft data.

11. A method as in claim 2, wherein the step of decoding includes a preliminary step of adaptively scaling soft data.

12. A method as in claim 2, wherein the step of decoding decodes less than an entire frame of soft data to generate the n Cumulative Metrics.

13. A receiver having an input coupled to an output of a communication channel, said receiver comprising a unit for determining a data rate of a received encoded signal, comprising:

a decoder for decoding a signal received from the communications channel to extract data therefrom, the data being received at one of a plurality of rates, said decoder generating a Cumulative Metric for each of the plurality of rates; and circuitry for modifying the cumulative metrics to orthogonalize the plurality of rates and for determining the correct received rate from the modified Cumulative Metrics.

14. A receiver having an input coupled to an output of a radio communication channel, said receiver comprising a unit for determining a data rate of an encoded signal received through the radio communication channel, comprising:

a decoder for decoding a signal received from the radio communication channel to extract data therefrom, the data being received at one of n rates and the signal being decoded at each of the n rates for generating n Cumulative Metrics; and circuitry for defining a matrix M composed of n mean vectors derived from the n Cumulative Metrics, for orthogonalizing the n rates by inverting the matrix M to form a matrix $M^{-1}$ and multiplying with an observable vector of Cumulative Metrics to obtain a discriminant vector, and for determining the correct rate from the discriminant vector as a row number containing a maximum value.

15. A receiver as in claim 14, wherein the circuitry derives the n mean vectors by averaging observable vectors over a plurality of frames and then normalizing.

16. A receiver as in claim 14, wherein the circuitry derives the n mean vectors by computing a covariance matrix over a plurality of frames, by performing an eigenvalue-eigenvector decomposition, by normalizing the eigenvectors norm, and by obtaining the eigenvector which has the largest eigenvalue.

17. A receiver as in claim 14, wherein the matrix $M^{-1}$ is computed in advance and stored in a memory that is accessible to a data processor that comprises a portion of said receiver.

18. A receiver as in claim 17, wherein the matrix $M^{-1}$ is computed in advance assuming a predetermined signal-to-noise ratio that corresponds to a predetermined frame error rate.

19. A receiver as in claim 14, and further comprising circuitry for testing a data integrity value associated with the received data.

20. A receiver as in claim 19, wherein the data integrity value is comprised of a CRC value.

21. A receiver as in claim 14, and further comprising a first unit for scaling soft data with at least one of a fixed or an adaptive scaling factor.

22. A receiver as in claim 21, and further comprising a second unit for scaling the Cumulative Metrics so as to undo the scaling applied by the first unit.

23. A receiver as in claim 14, wherein the decoder decodes less than an entire frame of soft data to generate the n Cumulative Metrics.

24. A receiver as in claim 14, wherein the radio communication channel uses a code division multiple access technique to convey the data from a remote transmitter to the receiver.

25. A receiver as in claim 14, and further comprising a first unit, coupled to an input of said decoder, for scaling soft data with an adaptive scaling factor, and a second unit, coupled to an output of said decoder, for undoing the adaptive scaling from the Cumulative Metrics.

\* \* \* \* \*